(12) United States Patent
Helmbro et al.

(10) Patent No.: US 11,295,069 B2
(45) Date of Patent: Apr. 5, 2022

(54) SPEECH TO TEXT ENHANCED MEDIA EDITING

(71) Applicant: SONY MOBILE COMMUNICATIONS INC., Tokyo (JP)

(72) Inventors: Robert Helmbro, Lund (SE); Ola Thorn, Lund (SE)

(73) Assignee: Sony Group Corporation, Tokyo (JP)

(*) Notice: Subject to any disclaimer, the term of this patent is extended or adjusted under 35 U.S.C. 154(b) by 369 days.

(21) Appl. No.: 16/087,711

(22) PCT Filed: Apr. 22, 2016

(86) PCT No.: PCT/IB2016/052315
§ 371 (c)(1),
(2) Date: Sep. 24, 2018

(87) PCT Pub. No.: WO2017/182850
PCT Pub. Date: Oct. 26, 2017

(65) Prior Publication Data
US 2020/0302112 A1    Sep. 24, 2020

(51) Int. Cl.
G06F 40/166    (2020.01)
G06F 40/247    (2020.01)
G10L 15/08    (2006.01)
G10L 25/78    (2013.01)

(52) U.S. Cl.
CPC .......... G06F 40/166 (2020.01); G06F 40/247 (2020.01); G10L 15/08 (2013.01); G10L 25/78 (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 3,632,883 A * | 1/1972 | Aagaard | H04Q 11/04 370/368 |
| 7,869,892 B2 * | 1/2011 | Foust | G11B 27/031 700/94 |
| 8,302,010 B2 * | 10/2012 | Phillips | G06F 40/166 715/723 |
| 8,332,212 B2 * | 12/2012 | Wittenstein | G10L 15/26 704/211 |

(Continued)

OTHER PUBLICATIONS

Steven Rubin; Tools for Creating Audio Stories; Electrical Engineering and Computer Sciences University of California at Berkeley Technical Report No. UCB/EECS-2015-237; 86 pages; Dec. 15, 2015; http://www.eecs.berkeley.edu/Pubs/TechRpts/2015/EECS-2015-237.html (Year: 2015).*

(Continued)

*Primary Examiner* — Benjamin Smith
(74) *Attorney, Agent, or Firm* — Renner, Otto, Boisselle & Sklar, LLP

(57) ABSTRACT

A device and method for editing media content analyze the media content to detect words in the media content. The detected words are converted to text and stored in a text container. A characteristic of the text within the text container is changed, and the media content is altered to correspond to the changed characteristic of the text within the text container.

17 Claims, 5 Drawing Sheets

(56) References Cited

U.S. PATENT DOCUMENTS

| | | | | |
|---|---|---|---|---|
| 8,548,618 | B1* | 10/2013 | Story, Jr. | H04N 21/439 |
| | | | | 700/94 |
| 8,966,360 | B2* | 2/2015 | Phillips | G10L 15/26 |
| | | | | 715/234 |
| 9,185,225 | B1* | 11/2015 | Vance | H04M 3/53333 |
| 9,496,000 | B2* | 11/2016 | Gilson | G10L 21/055 |
| 9,542,939 | B1* | 1/2017 | Hoffmeister | G10L 15/02 |
| 9,666,208 | B1* | 5/2017 | Rubin | G06F 3/167 |
| 9,741,392 | B2* | 8/2017 | Ngiam | G11B 27/28 |
| 9,942,581 | B2* | 4/2018 | Jin | H04N 21/44008 |
| 9,959,086 | B2* | 5/2018 | Na | G10L 15/26 |
| 9,984,677 | B2* | 5/2018 | Pinhasi | G10L 15/02 |
| 10,192,542 | B2* | 1/2019 | Chiang | G10L 15/1807 |
| 10,347,238 | B2* | 7/2019 | Jin | G11B 27/022 |
| 10,445,052 | B2* | 10/2019 | Rubin | G06Q 10/101 |
| 10,446,187 | B2* | 10/2019 | Gilson | G10L 21/055 |
| 10,564,817 | B2* | 2/2020 | Holmes | G06F 16/686 |
| 2008/0177536 | A1* | 7/2008 | Sherwani | G11B 27/10 |
| | | | | 704/235 |
| 2008/0275700 | A1* | 11/2008 | Bingley | G10L 13/08 |
| | | | | 704/235 |
| 2009/0319265 | A1* | 12/2009 | Wittenstein | G10L 21/04 |
| | | | | 704/234 |
| 2011/0239107 | A1* | 9/2011 | Phillips | G10L 15/26 |
| | | | | 715/234 |
| 2013/0047059 | A1* | 2/2013 | Phillips | G10L 15/26 |
| | | | | 715/203 |
| 2013/0231930 | A1* | 9/2013 | Sanso | G10L 15/26 |
| | | | | 704/235 |
| 2014/0201637 | A1* | 7/2014 | Na | H04N 5/772 |
| | | | | 715/719 |
| 2015/0279390 | A1 | 10/2015 | Mani | |
| 2015/0332732 | A1* | 11/2015 | Gilson | G11B 27/036 |
| | | | | 386/240 |
| 2016/0179831 | A1* | 6/2016 | Gruber | G06F 40/42 |
| | | | | 704/235 |
| 2017/0004858 | A1* | 1/2017 | Ngiam | H04N 9/802 |
| 2017/0092262 | A1* | 3/2017 | Pinhasi | G10L 15/02 |
| 2017/0169840 | A1* | 6/2017 | Rubin | G10L 21/12 |
| 2017/0195700 | A1* | 7/2017 | Jin | H04N 21/233 |
| 2017/0200471 | A1* | 7/2017 | Gilson | G10L 21/055 |
| 2017/0309271 | A1* | 10/2017 | Chiang | G10L 15/1807 |
| 2018/0018308 | A1* | 1/2018 | Zuo | G06F 40/166 |
| 2018/0095713 | A1* | 4/2018 | Rubin | G06Q 10/101 |
| 2018/0166071 | A1* | 6/2018 | Lee | G10L 25/48 |
| 2018/0173388 | A1* | 6/2018 | Holmes | G06F 3/0484 |
| 2019/0341068 | A1* | 11/2019 | Shen | H04L 12/1827 |

OTHER PUBLICATIONS

Jin, Z., Mysore, G., DiVerdi, S., Lu, J., Finkelstein, A.; VoCo: text-based insertion and replacement in audio narration; ACM Transactions on Graphics (SIGGRAPH) Published Jul. 31, 2017; 13 pages; https://ccrma.stanford.edu/~gautham/Site/Publications_files/voco-siggraph2017.pdf (Year: 2017).*

Whittaker, S., and Amento, B.; "Semantic speech editing" In Proceedings of the ACM Conference on Human Factors in Computing Systems (CHI), vol. 24, ACM (Apr. 2004), 527-534. https://doi.org/10.1145/985692.985759 (Year: 2004).*

Steve Rubin, Floraine Berthouzoz, Gautham J. Mysore, Wilmot Li, Maneesh Agrawala; Content-Based Tools for Editing Audio Stories; UIST 2013, Oct. 8-11, 2013. pp. 113-122.; https://doi.org/10.1145/2501988.2501993 (Year: 2013).*

Steve Rubin et al.; Capture-Time Feedback for Recording Scripted Narration; UIST '15, Nov. 8-11, 2015, Charlotte, NC, USA; ACM 978-1-4503-3779-3/15/11 DOI: http://dx.doi.org/10.1145/2807442.2807464 (Year: 2015).*

S. M. Chu and D. Povey, "Speaking rate adaptation using continuous frame rate normalization," 2010 IEEE International Conference on Acoustics, Speech and Signal Processing, 2010, pp. 4306-4309, doi: 10.1109/ICASSP.2010.5495656. (Year: 2010).*

Pfau, Thilo & Faltlhauser, Robert & Ruske, Günther. (2000). A Combination of Speaker Normalization and Speech Rate Normalization for Automatic Speech Recognition. 362-365. (Year: 2000).*

* cited by examiner

Fig. 4

File Edit View

▲ Search | contractum est |

Day 1 at 2:23:20

... somnium venit vera pro questus a job in Holmia-XXIII annus-senex a rigida Kalmar Gabriela. ... suspirasset sedens in officium Hatmansi agili, et protectus Colmarna coepit nova tria demo... quantam parum difficilis et desiderium adimplere Cur

Day 1 at 5:35:10

... suus difficile ut a. Hodie diaetam cum amico cementa Lidingo vero exhibit con quibus breve terminum, fuerit insertum esse, contractus extensum pluries dividi tribus mensibus annum, dein rex sese moveat. It tristis sentit, non sentio contractum esse a see Holmensi contiget-t. Quan putas esse? Omnia tempus. Full, omni tempore. Difficile capere scile non possis. Respondet locus de gets maxime Gabriella eruit an ad situm in scandalum, et toilens/responsionibus...

Day 3 at 3:10:43

Altus extra vellent scidit diaetam in Holmia Hanloge sicut annui. Maxime autem in cella, in illa tristia possint. Sed non picky Gabriella quia timet relinquere forum novae et movemur, quoniam parum difficilis est desiderium adimplere. Full, contractum est omni tempore. Next mensis illa precedit de tempore in Lidinga massa. Next mensis illa procedit de tempore in Lidingo massa.Habere domi suus maximus dicit Gabriella preces....

0:00:00 ─────────────────────────────────────────── 0:00.11

Sed cum quodam mane, difficilius fuit. Next mensis illa procedit de tempore in Lidingo massa. Potest claudere vol

Fig. 5

SPEECH TO TEXT ENHANCED MEDIA EDITING

RELATED APPLICATIONS

This application is a national phase entry of International Application No. PCT/162016/052315 filed on Apr. 22, 2016 and published in the English language, which is hereby incorporated by reference.

TECHNICAL FIELD OF THE INVENTION

The present disclosure relates to an apparatus and method for efficiently editing media content, such as audio content and/or other content that includes audio content.

DESCRIPTION OF THE RELATED ART

Media productions, such as podcasts, are often created from a large source of raw recorded audio. For example, a one hour podcast of a radio show may be formed to from the best portions of an entire radio show over a particular day or week. Consequently, the amount of audio data can be significant and thus editing process for producing a podcast that consists of only small parts of the raw audio can be time consuming.

SUMMARY

An apparatus and method in accordance with the present disclosure can overcome one or more drawbacks associated with conventional means for editing media content, such as audio content. More particularly, an electronic device and method in accordance with the present disclosure can perform a speech-to-text conversion of raw audio data, and store the text in a text container along with a time stamp. The time stamp corresponds to a start and end location of the audio form of the text in the media data. The text in the container then can be edited using conventional text editing concepts (e.g., find, replace, cut, paste, delete, move, etc.). For example, portions of the text may be cut from one location and moved to another location within the text container, or entire portions may be deleted, thereby leaving only certain portions of the text. The changes made to the altered text then can be used in conjunction with the time stamp to perform corresponding edits to the original media data.

An advantage of the apparatus and method in accordance with the present disclosure is that it enables the original content to be readily visualized by the editor (e.g., by displaying the text). Further, by converting the audio portion of the media content to text form, conventional text-editing concepts can be used to alter the audio portion of the media content (while in text form). Such conventional tools are easy and efficient to use, thus simplifying the editing process.

In addition to simplifying the editing process for media content, further analysis may be performed on the text to make the final media product correspond to predefined requirements. For example, certain media applications may impose a time limit on the length of a media file. In accordance with the present disclosure, the text derived from the media file can be automatically analyzed and manipulated so as to minimize the length of the final media product to satisfy the time limit. In this respect, filler words, background voices, unrelated sounds, etc. may be detected and omitted when converting the words to text form. Additionally, certain words may be replaced with their synonym, etc.

According to one aspect of the disclosure, a method for editing media content includes: analyzing the media content to detect words in the media content; converting the detected words to text and storing the text in a text container; changing a characteristic of the text within the text container; and altering the media content to correspond to the changed characteristic of the text.

To the accomplishment of the foregoing and the related ends, the device and method comprises the features hereinafter fully described in the specification and particularly pointed out in the claims, the following description and the annexed drawings setting forth in detail certain illustrative embodiments, these being indicative, however, of but several of the various ways in which the principles of the invention may be suitably employed.

Although the various features are described and are illustrated in respective drawings/embodiments, it will be appreciated that features of a given drawing or embodiment may be used in one or more other drawings or embodiments of the invention.

BRIEF DESCRIPTION OF THE DRAWINGS

FIG. 4 illustrates an exemplary text-search operator interface in accordance with the present disclosure.

FIG. 5 illustrates an exemplary text-select operator interface in accordance with the present disclosure.

DETAILED DESCRIPTION OF EMBODIMENTS

Figure 1:
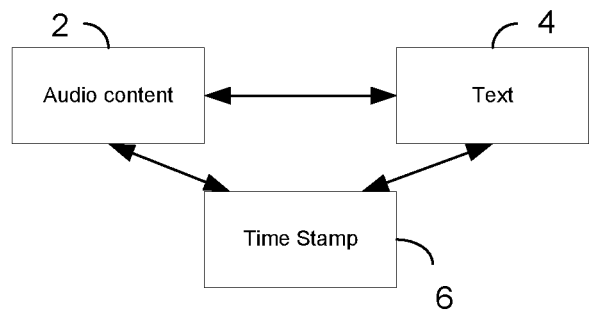
FIG. 1 is a block diagram illustrating a relationship between audio content, text, and a time stamp in accordance with the present disclosure.

Embodiments will now be described with reference to the drawings, wherein like reference numerals are used to refer to like elements throughout. It will be understood that the figures are not necessarily to scale. Also, features that are described and/or illustrated with respect to one embodiment may be used in the same way or in a similar way in one or more other embodiments and/or in combination with or instead of the features of the other embodiments.

The terms "electronic equipment" and "electronic device" may be used interchangeably and include portable radio communication equipment. The term "portable radio communication equipment," which herein after is referred to as a "mobile radio terminal," "mobile phone," "mobile device," or "mobile terminal", and the like, includes all equipment such as mobile telephones, pagers, communicators, i.e., electronic organizers, personal digital assistants (PDAs), smartphones, portable communication apparatus or the like. The terms "electronic equipment" and "electronic device" also may include digital music and/or video devices, e.g., iPod devices, mp3 players, portable game systems, televisions, portable television devices for use with televisions/display devices, home theater PC (HTPC) systems, etc.

The methods and devices in accordance with the present disclosure have particular utility in editing audio content and, thus, the embodiments are described chiefly in this context. However, aspects of the invention are applicable to other forms of media content. For example, aspects of the invention are applicable to editing media content that includes audio content (e.g., a video). As used herein, the term "media content" includes audio content alone and/or audio content in combination with other content (e.g., audio content and video content).

The present disclosure describes methods for editing audio content and devices for implementing such methods. As will be described in more detail below, audio content, such as live or pre-recorded audio content, is analyzed to identify words in the audio content. A time stamp is determined for and associated to each identified word, the time stamp indicating a temporal location in the audio content of the audio corresponding to the identified word. As used herein, a time stamp refers to a time period defining a start location and an end location for the audio of interest within the audio content. The time stamp may pertain to a word, phrase, sentence, paragraph, etc. The identified words are converted to text form and stored in a text container along with the associated time stamp. Once in text form, conventional text-editing tools can be used to search and/or rearrange the text. Based on the edits made to the text and the corresponding time stamp, corresponding changes are made to the original audio content. The modified audio content may then be stored in the original audio container or in a new audio container for use at a later time.

FIG. 1 illustrates a relationship between audio content 2, text 4, and a time stamp 6. More particularly, the text 4 is derived from words in the audio content 2, while the time stamp 6 is derived from a temporal location of the words within the audio content 2. The time stamp 6 is associated to the text, thereby linking the text 4 to the audio content 2. By editing the text 4, the corresponding audio content 2 can be edited based on the edits made to the text and the time stamp 6 corresponding to the edited text.

The audio editing method in accordance with the present disclosure has a number of advantages over the prior art methods. For example, since the audio content is converted to text form, conventional search tools can be used to locate specific words or passages in the text. This significantly simplifies the process of locating the portions of the audio content that are of interest to the person editing the content. Also, once in text form the audio content can be visualized simply by viewing the text. This is not possible using conventional editing methods, as the pure audio cannot be effectively visualized. Further, since a text representation of the audio content is provided, conventional text editing concepts can also be used to manipulate the text, which in turn can be applied to the actual audio file. Such conventional text editing concepts are well known in the art and can include, for example, find, replace, cut, paste, delete, move, or any other feature used to edit text. In this manner, audio content can be efficiently edited, for example, using text-based cut and paste tools, to provide a desired audio file.

For example, an individual may wish to use portions of a four-hour radio show to create highlights of the show. During the show, the individual may remember certain portions that were of interest to that individual. However, in the conventional art there is no efficient manner to search such audio content for those portions of interest. Thus one must know the general temporal location of the portions of that radio show that are of interest to the user in order to find the content. As will be appreciated, this can be a tedious task as it not only can be difficult to remember the locations of the content but also to find them within a four-hour recording. In accordance with the present disclosure, speech-to-text recognition is performed on the audio content to convert words in the audio content to text form, and the resulting text may be stored in a container (e.g., a file, database or other means for storing text data). Also, a time stamp is identified for each word in the audio content, and that time stamp is associated with the text generated from the word. Thus, for each text representation of a word, the location within the audio content is known.

Once in text form, a simple word search may be performed to identify the portions of interest. For example, it may be recalled that the radio DJ addressed a specific topic. Instead of listening through significant portions of the audio content to find the portion corresponding to the topic, one can simply perform a word search using a conventional text searching algorithm. Once found, the text then can be manipulated as desired. For example, the portion of interest can be selected and moved to a new location or to a new container, other portions may be deleted, etc. The actions performed on the text can then be correspondingly performed on the actual audio content. For example, if the text is modified so as to move or delete the text, based on the time stamp associated with the manipulated text the same action can be performed on the corresponding portion of the audio content. As will be appreciated, by manipulating the text audio content can be easily created/changed.

Figure 2:
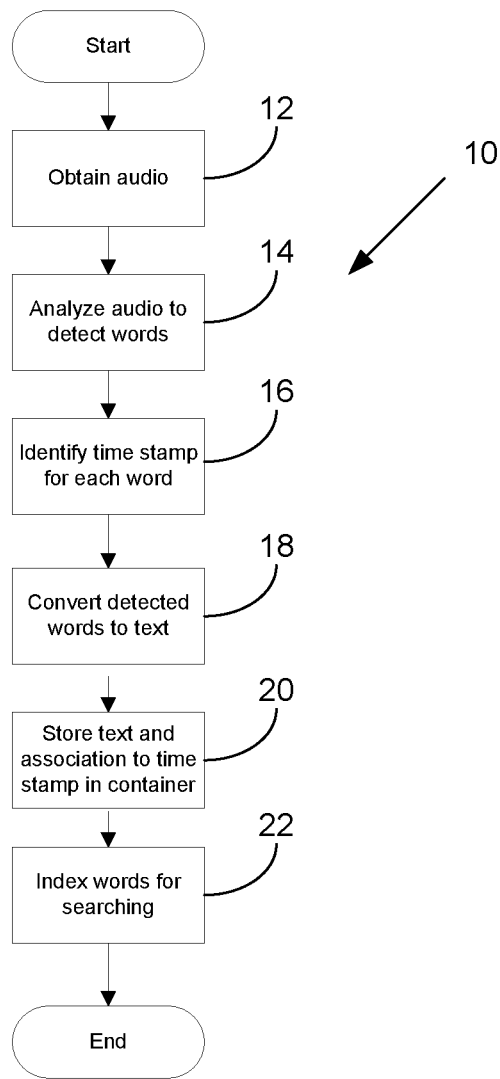
FIG. 2 is a flow chart illustrating exemplary steps for generating a text container corresponding to audio content in accordance with the present disclosure.
Figure 3:
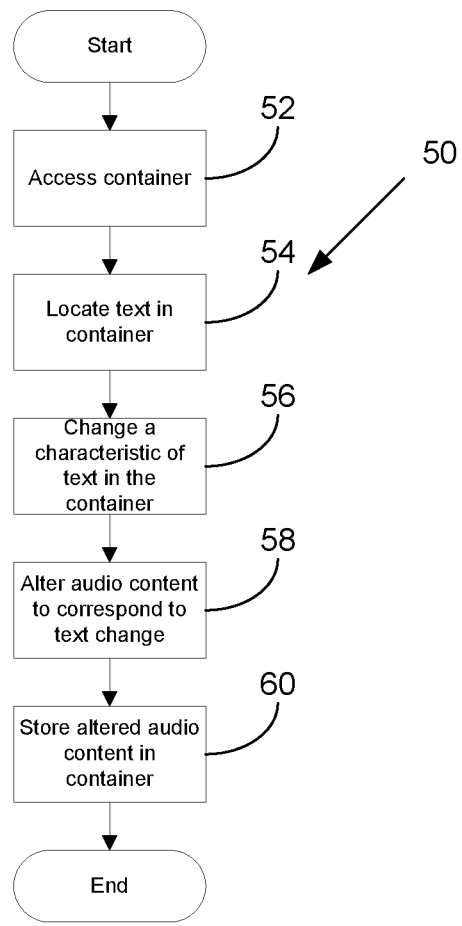
FIG. 3 is a flow chart illustrating exemplary steps for using the text container to manipulate the audio content in accordance with the present disclosure.

FIG. 2 illustrates an exemplary method 10 of converting audio content to text format in accordance with the present disclosure. FIG. 3 illustrates an exemplary method 50 of utilizing the converted audio content (i.e., the text) to edit the audio content using, for example, conventional text editing concepts. Variations to the illustrated methods are possible and, therefore, the illustrated embodiments should not be considered the only manner of carrying out the techniques that are disclosed in this document. Also, while FIG. 2 and FIG. 3 show a specific order of executing functional logic blocks, the order of executing the blocks may be changed relative to the order shown and/or may be implemented in an object-oriented manner or a state-oriented manner. In addition, two or more blocks shown in succession may be executed concurrently or with partial concurrence. Certain blocks also may be omitted. The exemplary method may be carried out by executing code stored by an electronic device, for example. The code may be embodied as a set of logical instructions that may be executed by a processor. Therefore, the methods may be embodied as software in the form of a computer program that is stored on a computer readable medium, such as a memory.

Beginning at block 12, the audio to which the conversion process is to be performed is obtained. The audio may be a live audio stream, such as a radio broadcast, a television broadcast, a public performance (e.g., a speech given at a seminar), etc. In this regard, the live audio stream may be fed in real time to an electronic device that performs the method in accordance with the present disclosure. Alternatively, the audio may be prerecorded audio, the recording stored in a container. Non-limiting examples of such containers include MP3, MP4, MPEG, WAVE, XIVIF, AIFF, AVI, FLV and the like.

Regardless of the format of the audio content, at block 14 the audio is analyzed to detect words in the audio content.

In performing the analysis, conventional speech recognition algorithms may be used to analyze the audio content and determine words in the audio content. If the audio content is live audio content, then it may be analyzed in real time, while if the audio content is prerecorded and stored in an audio container, then it may be analyzed at any desired time.

At block 16, a time stamp is identified for each word in the audio, the time stamp corresponding to a temporal location of the respective word within the audio content. Thus, for example, if the analysis determines a first sentence of the audio content to be "good morning, thanks for tuning in", a time stamp of 0.00-0.05 may be associated with the word "good", a time stamp of 0.06-0.10 may be associated with the word "morning", a time stamp of 1.1-1.15 seconds may be associated with the word "thanks", and so on. As described in more detail below, when the text corresponding to a word is manipulated, then the exact location of the audio content corresponding to that word is known from the time stamp.

Next at block 18 the detected words are converted to text form. The conversion process again can use conventional speech-to-text recognition algorithms as is known in the art. At block 20, the time stamp corresponding to each detected word then may be associated with the respective text form of the word and stored in a text container. As used herein, a text container refers to a storage means for storing the text form of the words, non-limiting examples of which include a database, text file, and the like.

Thus, as words are identified in the audio, the words are converted to text form and placed in a container, such as a text file, database or other container. Alternatively, the time stamp and/or association of the time stamp to the text form of the word may be stored in a separate location. Next at block 20, conventional indexing of the text may be performed to facilitate searching for words.

Accordingly, the steps illustrated in FIG. 2 generate a container that can be used to easily search for and modify words using, for example, conventional text editing concepts. As will be described in more detail below with respect to FIG. 3, the container can be used to find specific portions of the audio content and easily modify the audio content through the manipulation of the text in the container.

Referring to the exemplary method 50 illustrated in FIG. 3, at step 52 the container created in the exemplary method of FIG. 2 is accessed, for example, using conventional text editing concepts. Next at step 54 a user may search for a particular word or phrase in the text container using the text editing concepts. For example, the user may recall a particularly humorous moment in a radio broadcast (e.g., a joke or radio bit). Based on memory of the humorous portion, the user can enter a keyword upon which a search is to be performed. The search function then will locate the first instance of the word or phrase, and the user may confirm or reject the word or phrase as being correct. If the first instance of the word or phrase is not the desired portion of the audio content, the search may continue until the desired word or phrase is found in the text.

Once the desired text is found, then at step 56 a characteristic of the text is altered by the user. For example, a portion of the text may be selected via a pointing device or the like and dragged (moved) to a new location, or even to a new (separate) container. Additionally, the order of the text within the container can be rearranged as desired (e.g., the order of different topics may be rearranged as desired, words or sentences may be moved). Also, portions of text within the container may be deleted, etc. For example, the user may only wish to use a ten minute section of a four hour radio broadcast. In this case, the user may delete all of the text in the container except for the portion corresponding to the ten minutes of interest.

Based on the changes made to the text in the container, corresponding changes are automatically made to the audio component for that text as indicated at block 58. More particularly, a location of the audio component corresponding to the text is known from the time stamp associated with each text (word). Thus, if a portion of text is manipulated, the location of the audio portion corresponding to that text is also known. Therefore, if text corresponding to a word or group of words has been moved to a new location, the corresponding audio portion for that text is also moved. Similarly, if a large portion of text has been deleted, the corresponding audio portion is also deleted. In one embodiment, such change to the audio component may occur substantially concurrent with the changes made to the text. In another embodiment, the changes are made when the user requests the changes to be made (e.g., by activating an "execute" soft key or by saving the file to memory).

Once the audio component has been altered to correspond to the changes made to the text, the audio component may be stored in the same or different audio container. As discussed above, the audio container may be an mp3, mp4, mpeg, or other audio container.

Figure 4:
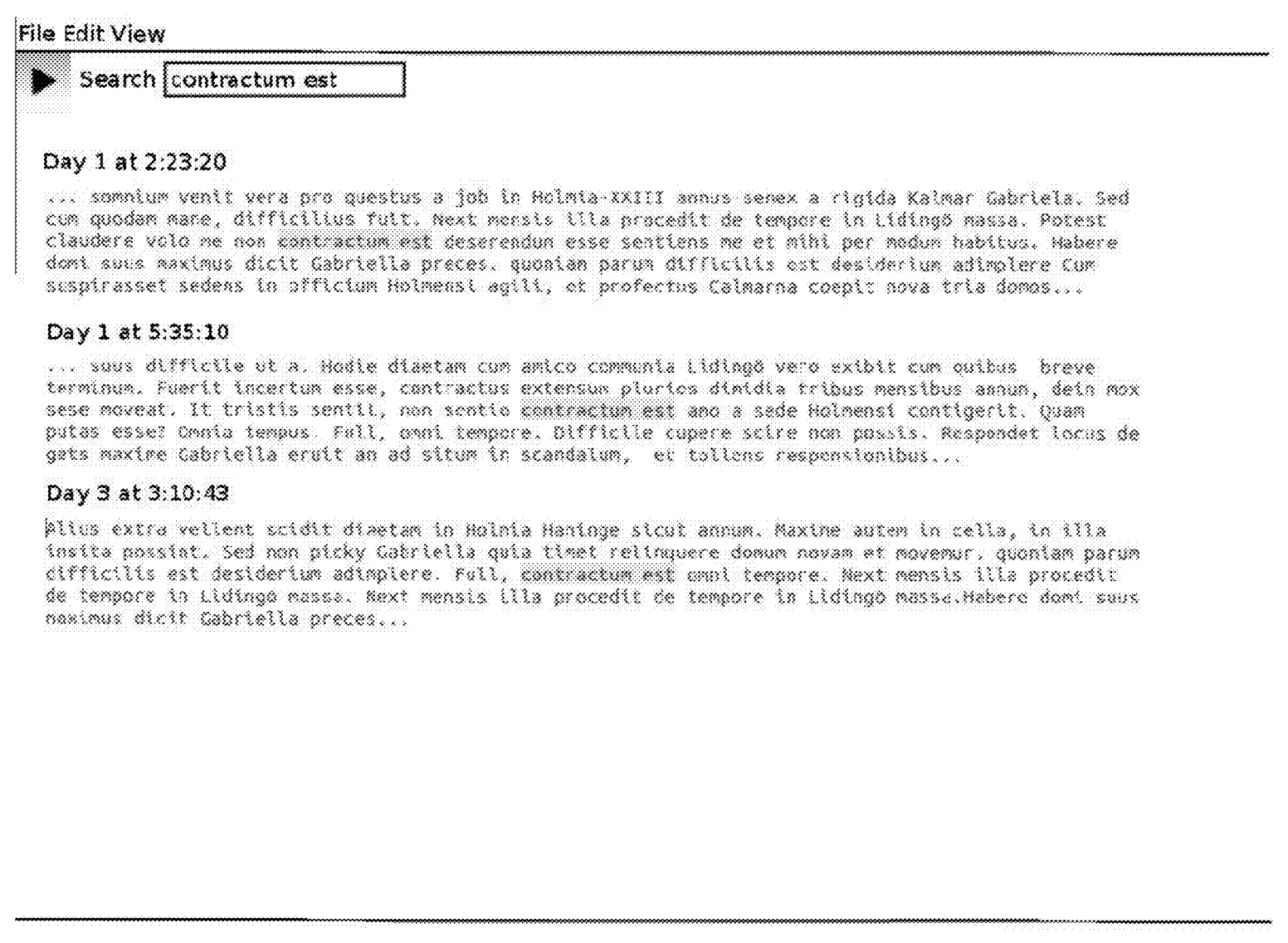

Referring briefly to FIGS. 3 and 4, illustrated is an exemplary interface for editing audio content in accordance with the present disclosure. In the examples of FIGS. 3 and 4, a producer wishes to create a one-hour audio production based on a trial that spanned three days (e.g., about 21 hours of audio content). The user may import the audio content into the editor in accordance with the present disclosure, which generates a text version of the words spoken in the audio content along with time stamps for each text representation of the word. The producer may wish to start the audio production with witness discussing a particular subject, and thus enters a keyword into a search utility of the audio editor. The search engine then searches the text and identifies each instance of the word or phrase. For example, and as shown in FIG. 4, each instance of the searched word over the three day trial may be highlighted. As shown in FIG. 5, the user can select the portion of the text that is of interest in creating the audio production, for example, by placing the cursor over the text of interest and selecting the text. The selected text then can be dragged and dropped to a new container that represents the audio production. This process can be repeated until the audio production is finalized. The producer then may select a create function and the audio editor proceeds to create a new audio file based on the changes made to the text.

In addition to providing a means to easily edit audio content, other editing tools can be implemented to create audio clips. For example, some applications (apps) for editing audio content have gained popularity and have a loyal following. These apps are not based on using speech-to-text as described herein. Instead, they provide a simple user interface for editing the audio file. Similar to the success of twitter (which has a limit on the length of a tweet), these audio apps have a time limit on the length of the audio clip (e.g., 18 seconds). The method in accordance with the present disclosure links text to audio. Therefore, if one wishes to export a new audio clip they may simply mark the text and execute a "save clip" soft key and the matching audio is saved.

A problem with 18 second limit of some apps is that words may be cutoff if the time limit is exceeded. One way to solve this problem would be to speed up the speech in the audio content to shorten the overall clip to the specified time. However, this can produce unnatural sounding speech that is difficult to understand. In accordance with the present disclosure, the text obtained from the conversion process of the original audio content is analyzed to determine how it may be modified to reduce the length of time of the final audio clip without significantly altering the sound of the speech.

Figure 6:
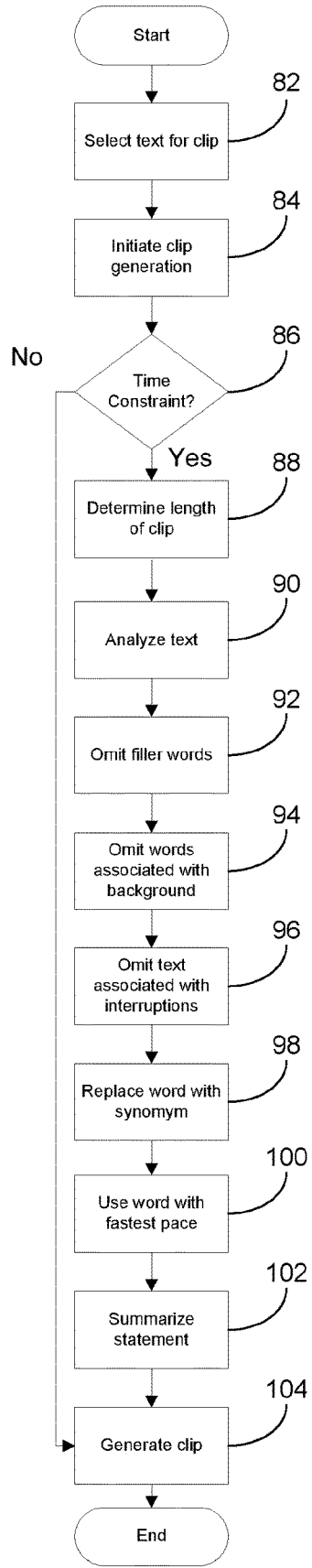
FIG. 6 is a flow chart illustrating exemplary steps for manipulating audio content in accordance with the present disclosure.

FIG. 6 illustrates exemplary steps of a method 80 for reducing the length of audio content in accordance with the present disclosure. While FIG. 6 illustrates a number of steps, it is noted that many of the steps are optional and need not be executed.

The method may be executed in the context of creating an audio clip from the original audio content. Thus, at block 82 a user may select a block of text (which had been generated in accordance with the method of FIGS. 1 and/or 2), the text corresponding to a portion of the entire audio for which the user wishes to create an audio clip. The text may be selected by simply positioning a cursor at the start of the text and highlighting the portion that is to form the audio clip. Once the text has been selected, the user may initiated an "execute" function as indicated at block 84. For example, a soft key or the like may be output on a display of an electronic device, and the user may initiate clip generation by clicking on the soft key.

Upon initiating clip generation, the method moves to block 86 where it is determined if a time constraint is associated with the clip. If a time constraint is not associated with the clip, then no further analysis is required and the method moves to block 104 were the audio clip is generated based on the selected text. However, if a time constraint is associated with the audio clip, then the method moves to block 88 where the maximum length of the audio clip is determined. Such determination, for example, may be based on user entry or based on a pre-stored value in memory of the electronic device. Next at block 90 the text is analyzed to determine how the text and corresponding audio may be edited to satisfy the specified time constraint. This can include, for example, analyzing the text to determine when a statement/sentence begins and ends, analyzing the content of the text (e.g., detecting filler words, detecting secondary sounds that interrupt a primary speaker), and/or the pace of the audio corresponding to each text representation of the word. Algorithms for determining such characteristics of the text are known to the person having ordinary skill in the art and thus are not described herein. The analysis is used at blocks 92-102, which address how the text and audio may be edited to satisfy the time constraint.

Blocks 92-102 identify a number of actions that may be applied to the text/audio file to satisfy the time constraint. One or more of the illustrated techniques may be applied to the audio file to obtain an audio clip that meets the time constraint. In other words, only one of blocks 92-102 may be executed, several of blocks 92-102 may be executed, or all of blocks 92-102 may be executed.

Optionally at block 92, text corresponding to filler words is omitted. Filler words may be predefined words, such as, for example, "umm", "ah", "mmm", or any other word that is typically used to bridge a gap in time as a user speaks. As will be appreciated, the filler words may vary based on language and/or dialect (e.g., filler words for the English language may be different from filler words in the Japanese language). As filler words are identified in the selected text, they are automatically removed.

Optionally at block 94, text corresponding to background speech and/or sounds is omitted. Such text may be identified, for example, based on differences in a frequency signature between a primary (main) speaker and another (background) speaker. Alternatively or additionally, such text may be identified based on differences in volume of the sound corresponding to the text. For example, a primary speaker likely is near a microphone and thus will be recorded at a desired volume level. Background speakers, however, likely will not be near the microphone and thus any sound recorded from such background speakers will have a lower volume relative to the primary speaker. Text associated with the lower volume speaker can be deleted.

Optionally at block 96, text corresponding to secondary sounds/interruptions of the primary speaker is omitted. Such text may be identified in a manner as described with respect to block 94.

Optionally at block 98, text for a particular word may be replaced with text for a synonym for the word. For example, text corresponding to the word "unbiased" can be replaced with text corresponding to the word "fair". The words "fair" and "unbiased" can have the same meaning, but the word "fair" is shorter than "unbiased" and thus consumes less audio time within the audio clip.

In some instances, the same word may be spoken a number of times throughout the audio content. Optionally at block 100 the pace or tempo of each instance of the word can be analyzed to determine which instance of the word is spoken fastest (i.e., has the quickest pace). The audio portion corresponding to the fastest pace of the word then can be associated to the text for that word. Thus, for example, if at time $T_1$, $T_2$ and $T_3$ the user speaks the word "unconstitutional" in a slow pace, and at time $T_4$ the user speaks the word "unconstitutional" at a fast pace, then if the selected text includes the word spoken at time $T_1$, $T_2$, and/or $T_3$, the audio corresponding to the multiple instances of the word at times $T_1$, $T_2$, and/or $T_3$ will be replaced with the audio for the same word at time $T_4$. In this manner, the time consumed by the audio clip is minimized.

Optionally at block 102, a summarizing algorithm may be applied to the text in order to reduce the number of words in the text container. For example, certain words, such as "a", "the", etc. may be omitted in order to reduce the length of the audio clip without altering the message conveyed by the audio clip. Such summarizing algorithms are known in the art and therefore not described herein.

Once the text and/or audio has been minimized to meet the time constraint, then at block 104 the modified text is used to export the audio corresponding to such text into an audio container to form an audio clip. Alternatively, instead of exporting the corresponding audio into a new audio container, the audio content may be retained in its original form and instead a database generated that describes the edits made to the text. When the audio content corresponding to the edited text is desired, a routine can be executed that retrieves the audio content from the original container based on information stored in the database.

Figure 7:
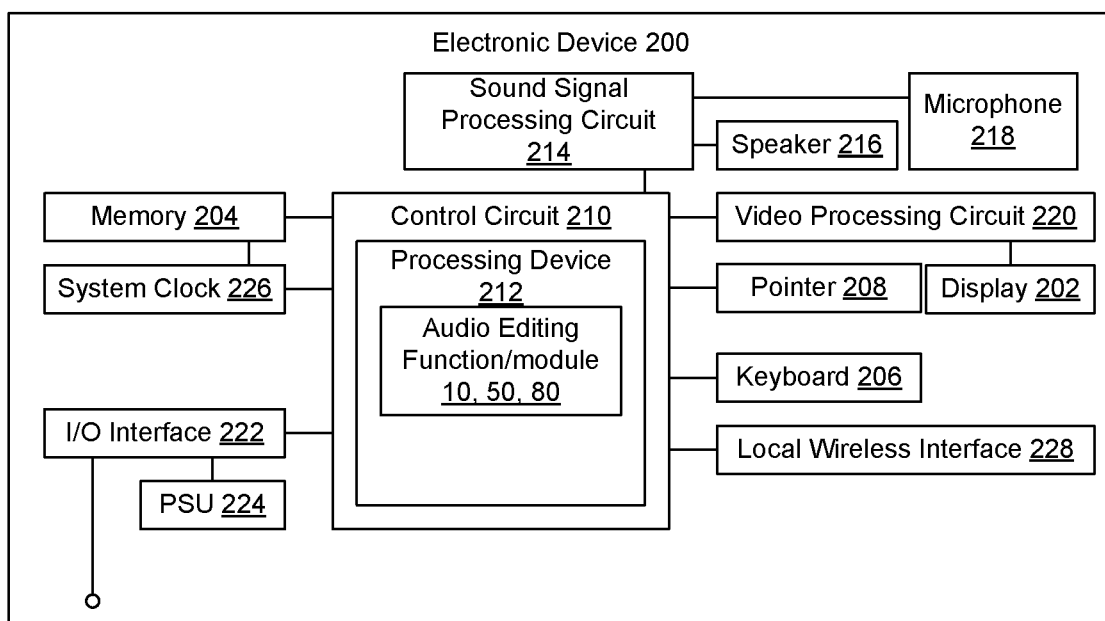
FIG. 7 is a schematic block diagram of a number of exemplary relevant portions of an electronic device for implementing the method in accordance with the present disclosure.

The above-described methods 10, 50 and 80 (referred to as media editing functions) may be performed by an electronic device 200, an example of which is illustrated in FIG. 7. The electronic device 200 may be any type of electronic device, examples of which include a mobile device, a tablet computer, a media player, a gaming device, a desktop computer, a laptop computer, etc. The electronic device 200 includes the media editing functions that are configured to carry out the editing method described herein.

The electronic device 200 may include a display 202. The display 202 displays information to a user such as text converted from audio, selection of text, etc., that enable the user to utilize the various features of the electronic device 200. The display 202 also may be used to visually display content received by the electronic device 200 and/or retrieved from a memory 204 of the electronic device 200.

Keyboard 206 and pointing device 208 provide for a variety of user input operations. For example, the keyboard may be used to enter text for a search query, while pointing device 208 may be used to selected text for export to a media clip. The keyboard and pointing functions also may be embodied as a touch screen associated with the display 202. Also, the display 202 and pointing device 208 may be used in conjunction with one another to implement soft key functionality.

The electronic device 200 may include a primary control circuit 210 that is configured to carry out overall control of the functions and operations of the electronic device 200. The control circuit 210 may include a processing device 212, such as a central processing unit (CPU), microcontroller or microprocessor. The processing device 212 executes code stored in a memory (not shown) within the control circuit 210 and/or in a separate memory, such as the memory 204, in order to carry out operation of the electronic device 200. For instance, the processing device 212 may execute code that implements the media editing function 10, 50, 80. The memory 204 may be, for example, one or more of a buffer, a flash memory, a hard drive, a removable media, a volatile memory, a non-volatile memory, a random access memory (RAM), or other suitable device. In a typical arrangement, the memory 204 may include a non-volatile memory for long term data storage and a volatile memory that functions as system memory for the control circuit 212. The memory 204 may exchange data with the control circuit 210 over a data bus. Accompanying control lines and an address bus between the memory 204 and the control circuit 212 also may be present.

The electronic device 200 may further include a sound signal processing circuit 214 for processing audio signals. Coupled to the sound processing circuit 214 are a speaker 216 and a microphone 218 that enable a user to listen and speak via the electronic device 200, as well as monitor the ambient sound. The sound processing circuit 214 is coupled to the control circuit 210 so as to carry out overall operation. Media data may be passed from the control circuit 210 to the sound signal processing circuit 214 for playback to the user. The media data may include, for example, audio data from an audio file stored by the memory 204 and retrieved by the control circuit 210, or received audio data such as in the form of voice communications or streaming audio data from a mobile radio service, podcast, etc. The sound processing circuit 214 may include any appropriate buffers, decoders, amplifiers and so forth.

The display 202 may be coupled to the control circuit 210 by a video processing circuit 220 that converts video data to a video signal used to drive the display 202. The video processing circuit 220 may include any appropriate buffers, decoders, video data processors and so forth. The video data may be generated by the control circuit 210 or obtained by any other suitable method.

The electronic device 200 may further include one or more input/output (I/O) interface(s) 222. The I/O interface(s) 222 may be in the form of typical I/O interfaces and may include one or more electrical connectors. The I/O interface(s) 222 may form one or more data ports for connecting the electronic device 200 to another device (e.g., a computer) or an accessory via a cable. Further, operating power may be received over the I/O interface(s) 222 and power to charge a battery of a power supply unit (PSU) 224 within the electronic device 200 may be received over the I/O interface(s) 222. The PSU 224 may supply power to operate the electronic device 200 in the absence of an external power source.

The electronic device 200 also may include various other components. For instance, a system clock 226 may clock components such as the control circuit 210 and the memory 204. A local wireless interface 228, such as an infrared transceiver and/or an RF transceiver (e.g., a Bluetooth chipset) may be used to establish communication with a nearby device, such as a radio terminal, a computer or other device.

Although certain embodiments have been shown and described, it is understood that equivalents and modifications falling within the scope of the appended claims will occur to others who are skilled in the art upon the reading and understanding of this specification.

What is claimed is:

1. A method for editing media content, comprising:
    analyzing the media content to detect words in the media content including determining a time stamp for each of the detected words, wherein analyzing comprises detecting multiple instances of a same word within the media content and analyzing a pace of each of the multiple instances to identify which one of the multiple instances of the same word has the quickest pace;
    converting the detected words to text and storing the text in a text container, wherein the time stamp for each of the detected words is associated with the text corresponding to the respective word and corresponds to a temporal location having a start location and an end location of the respective word within the media content;
    changing a characteristic of the text within the text container, wherein changing comprises associating the text corresponding to each of the multiple instances of the same word within the media content to the one of the multiple instances of the same word having the quickest pace; and
    altering the media content to correspond to the changed characteristic of the text.

2. The method according to claim 1, wherein changing a characteristic of the text comprises rearranging an order of the text within the text container.

3. The method according to claim 1, wherein changing a characteristic of the text comprises deleting at least a portion of the text within the text container.

4. The method according to claim 1, wherein analyzing the media content includes analyzing the media content in real time.

5. The method according to claim 1, wherein analyzing the media content includes analyzing media content stored in a media container.

6. The method according to claim 1, further comprising storing the altered media content in a media container.

7. The method according to claim 5, wherein the media container comprises at least one of an mp3 container, a way container, AVI container or MPEG container.

8. The method according to claim 1, further comprising storing the time stamp and the association to the word in the text container.

9. The method according to claim 1, further comprising determining a start and an end of a statement based on the converted text.

10. The method according to claim 1, further comprising selecting text stored in the text container, and exporting media corresponding to the selected text into a media container.

11. The method according to claim 1, wherein analyzing comprises detecting filler words within the media content, and converting comprises omitting the filler words from the conversion process.

12. The method according to claim 1, wherein analyzing comprises detecting in the media content sounds other than spoken words, and converting comprises omitting the sounds other than spoken words from the conversion process.

13. The method according to claim 1, wherein analyzing includes detecting a secondary sound that interrupts a primary speaker of the media content, and converting comprises omitting the secondary sound from the conversion process.

14. The method according to claim 1, wherein changing comprises applying a summarizing algorithm to the text in the text container in order to reduce the number of words in the text container.

15. The method according to claim 1, wherein analyzing comprises replacing at least one detected word with a synonym for the detected word.

16. An electronic device, comprising:
a processor;
a memory operatively coupled to the processor; and
a media editor module for editing media content, the media editor module stored in the memory and executable by the processor, wherein when executed by the processor the media editor module causes the electronic device to perform the steps of:
analyzing the media content to detect words in the media content including determining a time stamp for each of the detected words, wherein analyzing comprises detecting multiple instances of a same word within the media content and analyzing a pace of each of the multiple instances to identify which one of the multiple instances of the same word has the quickest pace;
converting the detected words to text and storing the text in a text container, wherein the time stamp for each of the detected words is associated with the text corresponding to the respective word and corresponds to a temporal location having a start location and an end location of the respective word within the media content;
changing a characteristic of the text within the text container, wherein changing comprises associating the text corresponding to each of the multiple instances of the same word within the media content to the one of the multiple instances of the same word having the quickest pace; and
altering the media content to correspond to the changed characteristic of the text.

17. The electronic device according to claim 16, wherein the electronic device comprise a mobile phone.

* * * * *